(No Model.)
E. J. HOFFMAN.
BOILER CLEANING COMPOUND.
No. 450,232. Patented Apr. 14, 1891.
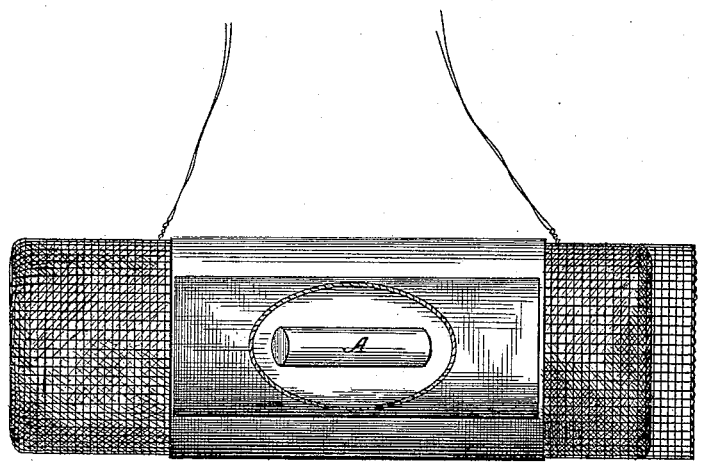

UNITED STATES PATENT OFFICE.

EDWARD J. HOFFMAN, OF SIOUX CITY, IOWA, ASSIGNOR TO THE ELECTRIC CARBON MANUFACTURING COMPANY, OF SAME PLACE.

BOILER-CLEANING COMPOUND.

SPECIFICATION forming part of Letters Patent No. 450,232, dated April 14, 1891.

Application filed August 12, 1890. Serial No. 361,839. (No specimens.)

*To all whom it may concern:*

Be it known that I, EDWARD J. HOFFMAN, a citizen of the United States, residing at Sioux City, in the county of Woodbury and State of Iowa, have invented certain new and useful Improvements in Boiler-Cleaning Compounds; and I do hereby declare the following to be a full, clear, and exact description of the invention, such as will enable others skilled in the art to which it appertains to make and use the same.

My invention has relation to an improvement in compounds for cleaning the inside surfaces of boilers, both stationary and locomotive; and the object in view is to produce a composition which can be readily molded into convenient form for insertion in the boiler, and which will have no injurious effect upon the iron, but will act to thoroughly purge it of all scale and corrosion and leave the water soft and free from all foreign matter.

With these ends in view my invention consists in the composition of ingredients and the proportions in which the same are used, more specifically set forth hereinafter, and recited in the claim.

The accompanying drawing represents one of the pencils or rods A formed of the compound inclosed in a galvanized-wire pouch, and in this form it is arranged to be inserted through the hand-holes of the boiler.

The composition consists of the following ingredients: gum of japonica, 52.085 per cent.; oak-bark, 18.000 per cent.; borax, 11.584 per cent.; calcined magnesia, .800 per cent.; carbonate of sodium, .664 per cent.; water, 16.867 per cent. These are placed together in a proper receptacle and melted by steam process or otherwise until the mass is brought to the proper consistency for molding, when it is put in suitable molds and pressed to the proper form. After remaining in the molds some length of time (about forty-eight hours) the compound will become very hard and somewhat elastic and has been given the shape of a bar or stick of material oval in cross-section, which particular form adapts it for ready insertion through the hand-holes of a boiler. In any kind of water used the composition separates the matter in solution, the water thus treated having an alkali reaction and counteracting any possible acid corrosion on the iron of the boiler. The action on scale and incrustation is dissolvent, and all the foaming matter is destroyed, leaving the water in the boiler soft and free from all foreign matter.

I do not wish to confine myself to the exact proportions herein specified, as they might be varied without materially affecting the action of the compound.

Having thus described my invention, what I claim as new, and desire to secure by Letters Patent, is—

The herein-described boiler-cleaning compound, consisting of gum of japonica, oak-bark, borax, calcined magnesia, carbonate of sodium, and water, mixed together in the manner set forth.

In testimony whereof I affix my signature in presence of two witnesses.

EDWARD J. HOFFMAN.

Witnesses:
B. T. FRENCH,
J. M. BROWN.